United States Patent
Crespel et al.

(10) Patent No.: US 6,415,092 B1
(45) Date of Patent: Jul. 2, 2002

(54) ACCESS BOX FOR ONE OR MORE OPTIC FIBERS IN A TENSIONED CABLE

(75) Inventors: Daniel Crespel, Lannion; Daniel Le Bras, Plestin-les-Gréves, both of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/572,205

(22) Filed: May 17, 2000

(30) Foreign Application Priority Data

May 19, 1999 (FR) .............................. 99 06360

(51) Int. Cl.[7] .............................. G02B 6/00; G02B 6/44
(52) U.S. Cl. .......................... 385/135; 385/114
(58) Field of Search ................................ 385/135, 140, 385/139, 136, 137, 114

(56) References Cited

U.S. PATENT DOCUMENTS

| | | | |
|---|---|---|---|
| 5,201,021 A | 4/1993 | Delage et al. | 385/114 |
| 5,335,304 A | 8/1994 | Smith et al. | 385/135 |

FOREIGN PATENT DOCUMENTS

| | | |
|---|---|---|
| DE | 32 35 723 | 3/1984 |
| DE | 40 29 857 | 3/1992 |
| DE | 41 16 912 | 11/1992 |
| DE | 42 14 377 | 11/1993 |
| EP | 0 803 753 | 10/1997 |
| EP | 0 936486 | 8/1999 |
| SE | 97 42694 | 11/1997 |

*Primary Examiner*—Brian Sircus
*Assistant Examiner*—Chandrika Prasad
(74) *Attorney, Agent, or Firm*—Nilles & Nilles SC

(57) ABSTRACT

An access box for one or more optic fibers in a tensioned cable has a structural section that integrates the passing cable and has a central connection system area demarcated by two connection bases to which there are connected a plurality of cleaved optic fibers. The connection system area has a plurality of mini-cables providing for the shuffling of the cleaved optic fibers and/or a plurality of branching cables providing for the branch connection of the cleaved optic fibers. A box of this kind can be used for the shuffling and/or branch connection of a plurality of optic fibers on a tensioned cable, when the cable is being laid or subsequently.

15 Claims, 5 Drawing Sheets

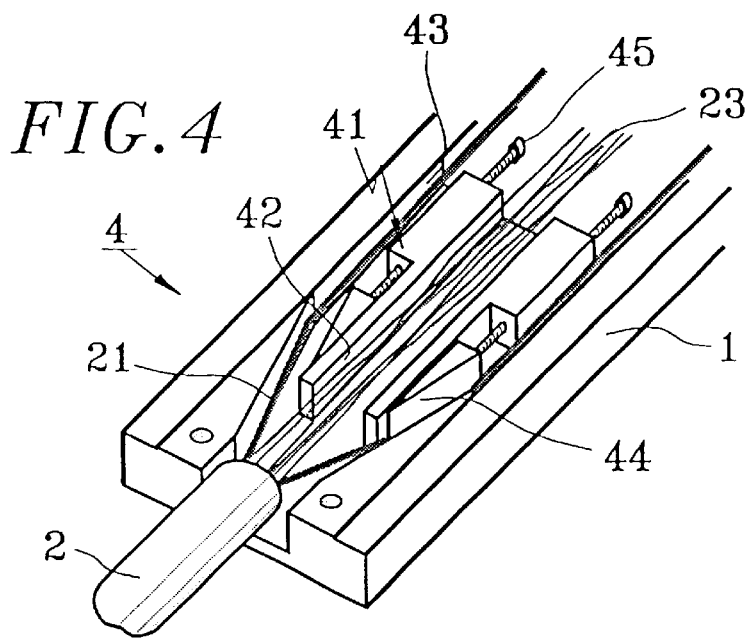
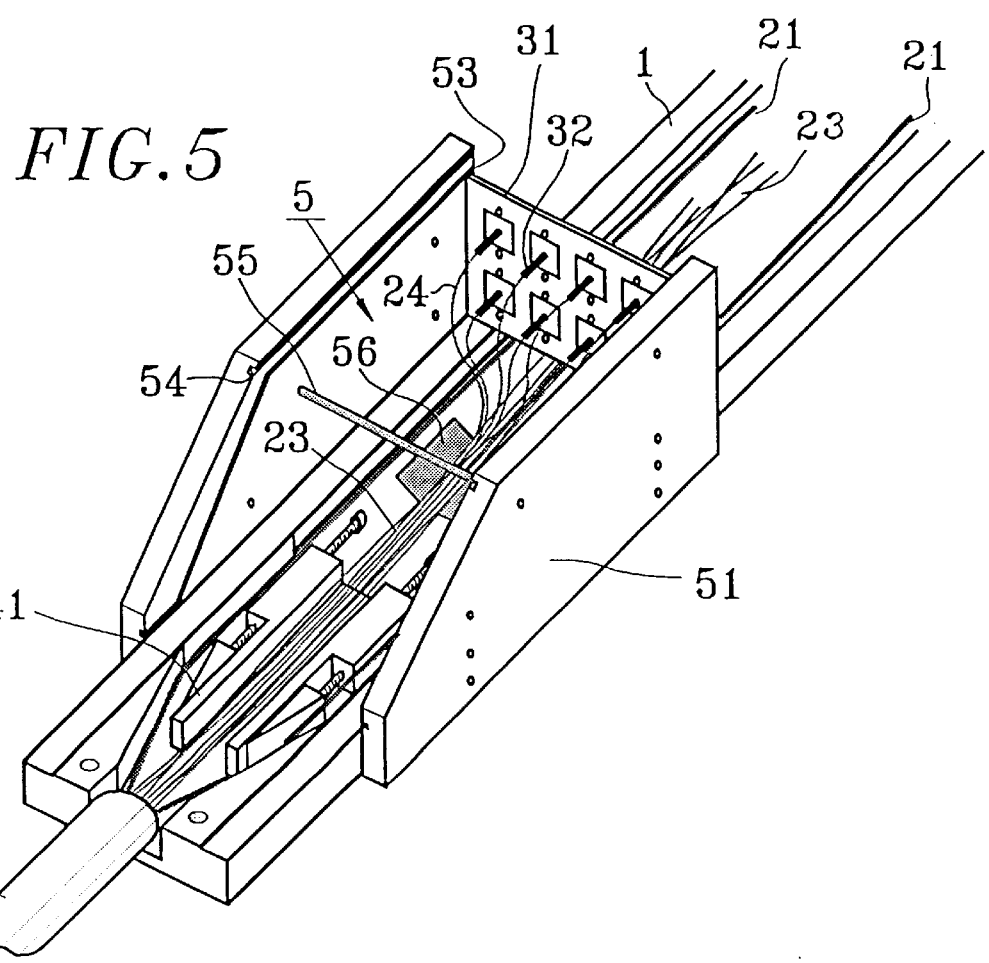

ACCESS BOX FOR ONE OR MORE OPTIC FIBERS IN A TENSIONED CABLE

BACKGROUND OF THE INVENTION

1. Field of the Invention

The invention relates to an access box for one or more optic fibers in a tensioned cable.

This type of box can be used firstly to carry out a branch connection of optic fibers along their passage and, secondly, to modify the configuration of an optic fiber distribution network in an infrastructure of buildings.

The present invention can be applied especially to the setting up of optic fiber telecommunications networks in layouts for buildings, groups of buildings, and other business customer sites.

2. Description of the Prior Art

Cable configurations in buildings are generally of the tree-and-branch type and are not protected.

Indeed, a tree-and-branch type configuration of this kind generally uses copper or optic cables for the passage of fibers on paths going from point to point. All these cables leave from a given starting point and get distributed towards a plurality of arrival points. It is clear that this type of infrastructure is extremely vulnerable to accidental breaks in a cable.

However, another configuration can be made to secure the network through the technique of branch connection on a looped cable route.

In general, making a branch connection is an operation in which one or more wires or fibers of a passing cable are branched in order to be connected to another cable.

The branch connection technique is a relatively recent technique for optic fibers in which the optic fiber or fibers to be branched are cut in order to be connected to other fibers in another cable, known as a stub cable.

This technique has been developed by the present Applicant with the Flexible Optical Networks (ROF or Reseaux Optiques Flexibles). Reference may be made to the diagram of FIG. 1 which illustrates the principle of making branch connections on this type of network.

For a clearer understanding of the invention, we shall first of all recall the development of the structure of currently available optic fibers.

The first cables specially designed for making inter-city networks were cables with grooved rods.

Later, the technique of tubed cables was developed in order to better protect the fiber and to encase it. These tubes replace the grooves and protect the fibers more efficiently.

The method of manufacturing tubed cables is more advantageous and costs less than the method of manufacturing grooved cables. These cables are illustrated in FIGS. 2A and 2B which respectively show a view in perspective and a sectional view.

These cables were used to set up inter-exchange links. They were connected by both ends and were very often used over great distances (for inter-city connections, to set up what are known as national networks).

Thereafter, a new approach to distribution was envisaged for setting up networks in urban areas. This led to Flexible Optical Networks (ROF).

These networks which are looped, and therefore secured by a return along a different route, give improved reliability. They are used for providing connections to large corporate entities such as banks.

Connections for business customers have been developed very recently, most usually in urban areas, with the use of the branch connection technique.

One development, related to increasing expertise in manufacturing techniques and falling costs, has given rise to two designs of cables known as single-tube cables or distribution cables. These cables have optical characteristics substantially equal to those of inter-city network cables but have reduced weight (the weight is halved for the same diameter) and a greater number of fibers (four to five times more fibers).

Cables of this kind are illustrated in cross-section views in FIGS. 2C and 2D.

Unlike inter-city transport cables, the structure of the single-tube cables is characterized, for cables that may contain up to 288 fibers, by a thick high-density polyethylene tube in which two or four carriers or "strength members" are placed cross-wise. These strength members are made of fiberglass composite or aramid yarn and have a role of stabilizing the material. Both their tensile strength and their compressive strength facilitate laying.

The optic fibers are sheathed in groups in flexible modules.

The encasing of the fibers forming the single-tube cables results in two types of optical modules, namely: flat-cable fibers and flexibly encased fibers.

ribbon fibers or flat-cable fibers which are illustrated in FIG. 2C are encased side by side in a polymerized sheathing. This encasing, done during manufacture, facilitates the ground connection.

Flexibly sheathed fibers are encased in bulk, and are commonly called micro-ducts. They are illustrated in the drawing of FIG. 2D. These fibers are loose in this sheathing which is colored. The association of several sheathings is close to the prior art used for a copper cable. The color-coding makes it possible to identify a module at the end, and also within a cable section.

Conventionally there are two types of optic fiber connections.

A first type of connection consists of fusion splicing, solder splicing or splicing by mechanical means. The optical cores are aligned and the optic fibers can be placed in V-grooved supports or in ferrules. This type of connection is characterized by the fact that it cannot be dismantled.

The second type of connection consists of the use of connection elements. Optic fibers are held in dismountable devices that are aligned so as to align the cores of the fibers.

A connection by splicing makes it necessary to plan for excess cable length so that the splice can be cut and the connection modified.

A branch connection is added to the network by means of boxes designed for national networks. The role of these boxes is to provide for the mechanical and optical continuity of the cable in the connection areas. There are different kinds of boxes.

Base connector boxes enable the insertion of the cables into tubings. The optic fibers are organized inside the box and a dome or a cover protects the unit. These boxes are used in most of the English-speaking countries.

Bucket (or tray) type boxes are often prism-shaped. Cable passages are positioned so as to be opposite each other. In the continuity of the cable passage, an anchoring system is used to make all the cable strength members continuous. There are therefore as many anchorings as there are cables.

These cables can enter by either side of the box through various sealed tubings or passages. The cable crossing is located in the same plane as the joint plane of the box. The entire box therefore has to be enclosed, usually by means of resins for tight sealing. The fibers can be accessed only by completely disassembling the box and opening the joint plane.

The two cable ends enter the box in a widely sized space, and the bundle of fibers is coiled in cartridges or trays positioned in the box.

A box of this kind, designed for use in line with an over-length of cable on each side is increasingly being used in a herringbone pattern, i.e. with the cables entering by only one side.

Two other boxes have been described in order to adapt the branch connection to the most recent cable structures:

One box which has been the object of the patent application No. FR 96 07887 is characterized by its round shape. The over-length of cable is wound on the perimeter, so that the connection can be made outside the pulling chamber. This box can be upgraded by the assembling of one or more base connectors.

The primary drawback of a box of this kind is that it cannot be made on an industrial scale. It is designed for making branch connections on cables that are flexible so that they can be wound. The reduction in of the volume of the anchoring and the integration with tight sealing is valuable but costly. Furthermore, it is necessary to have cavities to accommodate the anchorings.

Another branch connection box, in the form of a tray as in the above description, consists of two symmetrical elements. This box is valuable because it is more compact and also because it uses mechanical tight sealing. In practice, this box is a developed version of the tray-type boxes described here above and has the same drawbacks.

Indeed, it has cumbersome anchorings and coiling structures that are not justified since only a few fibers need to be organized in the case of a branch connection. The strength member of the cable is cut up and reconstituted by the anchoring in the box. This gives rise to lengthy operations.

The coiling area or fiber access area does not facilitate the ergonomy of the connection. Indeed, in the case of a branch connection, it is desirable to have a length of at least 80 cm (40 cm on each side).

In short, with the existing boxes, the mechanical elements of the cable have to be reconstituted after having been cut. The anchoring operation gives rise to bulky and costly devices and introduces complexity into the designing of the boxes.

Most of the boxes presently available in the market do not provide for the possibility of making a branch connection from a passing optic fiber in a tensioned cable.

Furthermore, the existing branch connection boxes use connections made by the splicing of branched fibers. As a result, unnecessary fibers are left in the network. In addition, it is impossible to modify these connections.

Furthermore, there is no access box that can be used to modify the configuration of the fiber network after the infrastructure of the network has been installed, since all the connections are made by soldering and since the ergonomy of the box does not allow it.

SUMMARY OF THE INVENTION

An aim of the present invention is to overcome the drawbacks of the prior art.

To this end, the present invention proposes an access box comprising a connection system area for the shuffling and/or branch connection of a plurality of optic fibers.

The connection system area can furthermore be accessed at any time during and after the laying of the cable.

A more particular object of the invention is an access box for one or more optic fibers in a tensioned cable, the box comprising a structural section that integrates the passing cable and having a central connection system area demarcated by two connection bases to which there are connected a plurality of cleaved optic fibers, said connection system area having a plurality of mini-cables providing for the shuffling of the cleaved optic fibers and/or a plurality of branching cables providing for the branch connection of the cleaved optic fibers.

According to one characteristic, the box furthermore comprises anchoring areas located at each end of the structural section, each anchoring area comprising a spacer enabling access to the optic fibers of the cable.

According to one particular feature of the invention, the sheath of the cable is axially cut into two half-sheaths so as to release the optic fibers, each spacer device having two side cavities for the passage of the half-sheaths and a central cavity for the passage of the released optic fibers.

Each anchoring area has an anchoring cap.

According to another characteristic, the box furthermore comprises an area for the passage of the non-cleaved optic fibers located beneath the connection system area.

The passage area comprises an optic module cap.

The connection system area has a connection system cap, said cap being removable.

According to another characteristic, the box furthermore comprises two coiling areas that bracket the connection system area and are capable of receiving the cleaved optic fibers.

Each coiling area defines a volume demarcated by each connection base and by flanges attached to each side of the structural section.

Each coiling area has a safety cap.

According to one particular feature, each flange has a first groove in its upper part capable of working together with the safety cap.

According to another particular feature, the spacing between the flanges is maintained by one or more distance sleeves.

According to another characteristic, the box furthermore comprises a branch connection cap covering the cables branched between the connection system area and the end of the structural section.

According to one particular feature, each flange has a second groove above the first groove capable of working with the branch connection cap.

According to another characteristic, the structural section, when seen in a sectional view, has a U shape partially closed to form a slideway.

The box according to the invention has the advantage of reconstituting the protection of the cable in the work area and eliminates the drawbacks of the prior art, especially by preserving the integrity of the cable sheathing.

Indeed, the anchoring areas preserve the cable sheathing after it has been cut into two half-sheathings that cross the access box of the invention without a break and without hampering access to the fibers.

The invention furthermore retains the continuity of the optic fibers and provides for a limited hierarchy of the branch-connected fibers without any management and organization device.

No optic fiber section is left in the network after the branching of an optic fiber.

The invention can be used in service ducts (vertical or horizontal cableways) given the small cross-section of this box whose axis is coincident with that of the cable.

Furthermore, these access boxes do not require costly over-lengths which are difficult to manage and exploit.

BRIEF DESCRIPTION OF THE DRAWINGS

Other particular features and advantages of the invention shall appear from the following description given as an illustrative non-restricted example and made with reference to the appended figures, of which:

FIG. 4 is a detailed drawing of the anchoring area of the box according to the invention;

FIG. 5 is a detailed drawing of the fiber coiling area in the box according to the present invention;

The box according to the present invention provides access to one or more optic fibers 23 in a tensioned cable 2.

A cable 2 of this kind travels along a path in a building or on an industrial site. It is open on a length of about one meter at several places close to points where they may be needed by customers or equipment.

Figure 1:
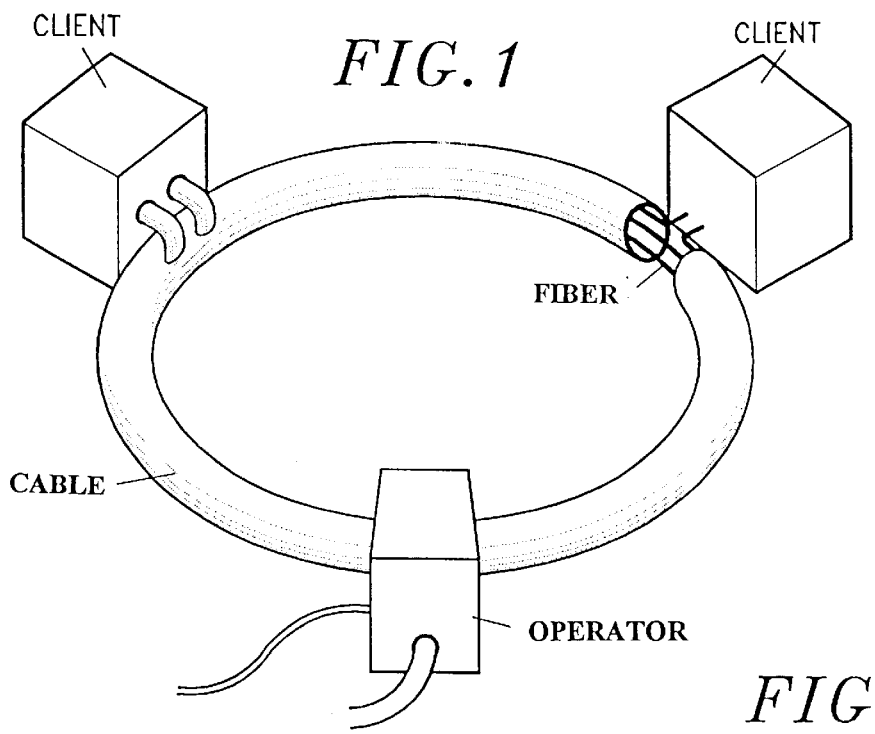
FIG. 1, which has already been described, is a diagram illustrating the principle of connection to a passing cable.
Figure 2A:
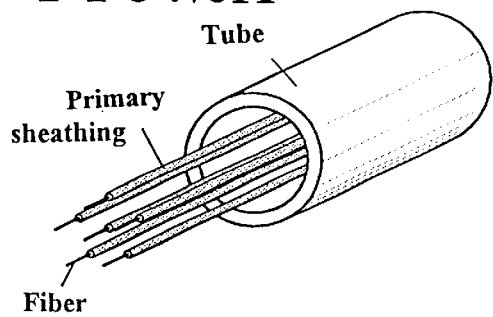
FIGS. 2A and 2B, which have already been described, represent different structures of prior art single-tube cables.
Figure 2B:
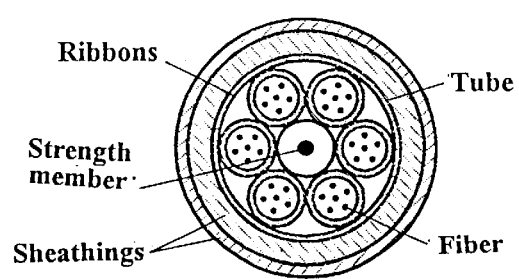
Figure 2C:
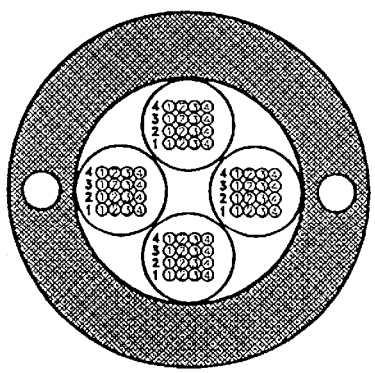
FIGS. 2C and 2D, which have already been described, show structures of single-tube cables with ribbon and microduct type fiber modules respectively.
Figure 2D:
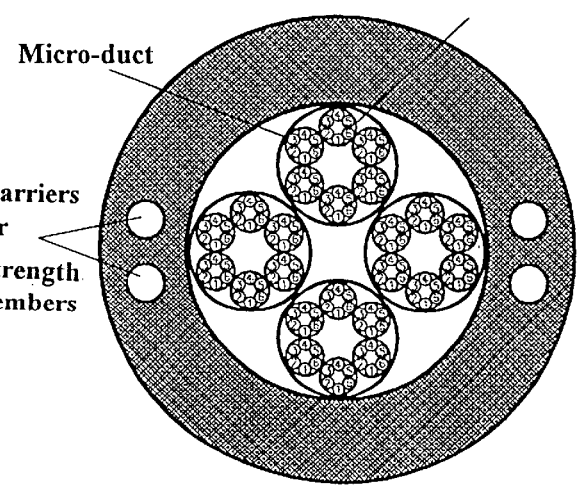
Figure 3:
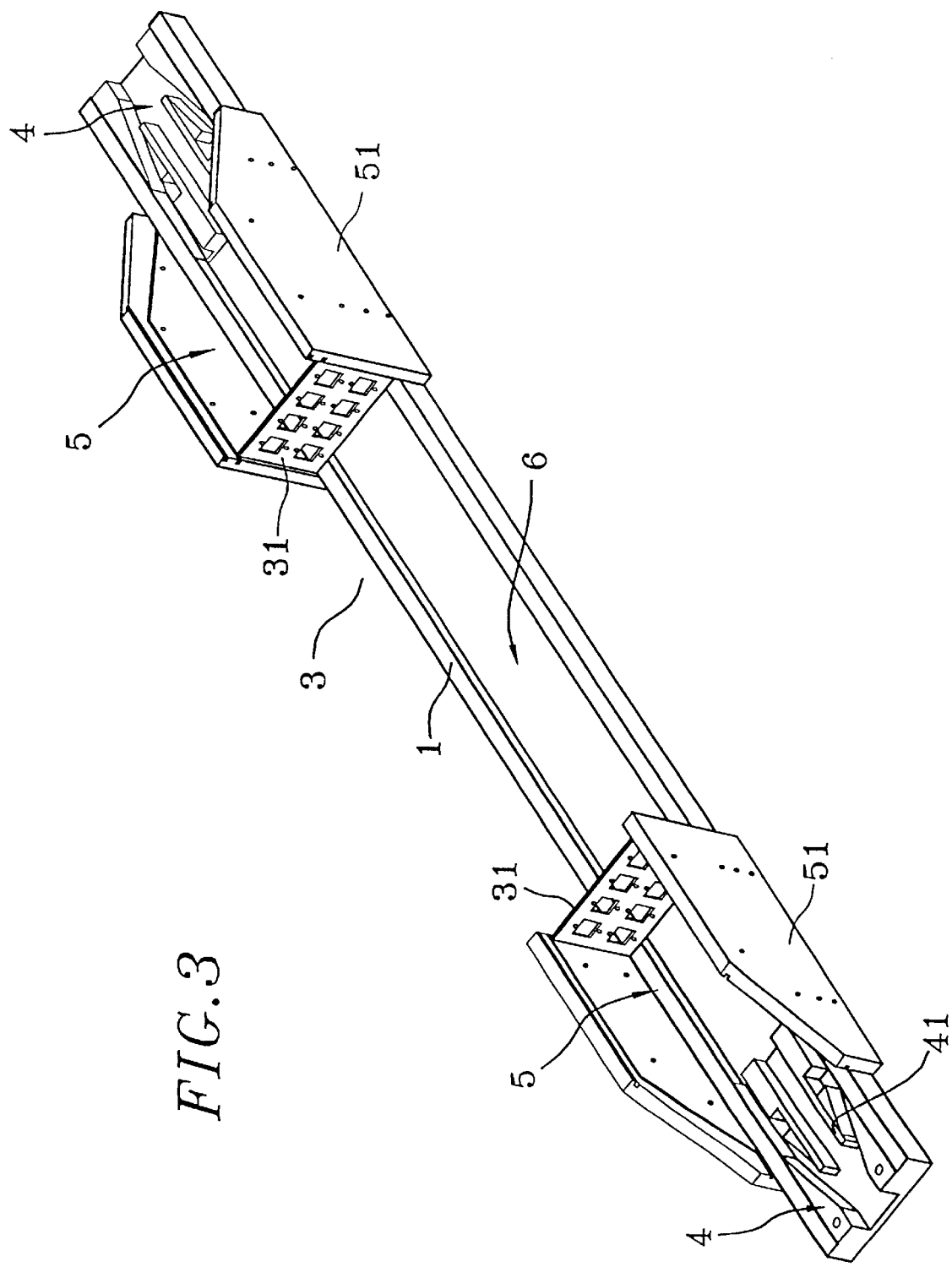
FIG. 3 is a drawing in perspective of the access box according to the invention, without its protective caps.

Referring to FIG. 3, the access box according to the present invention consists of a structural section 1 and can be subdivided essentially into three areas, one connection system area 3 with two coiling areas 5, one on each side of it, and two anchoring areas 4 located at each end of the structural section 1.

The structural section 1, seen in a cross-section, has a partially closed U shape so as to form a slideway. It extends over a length of about one meter.

The connection system area 3 is delimited by two connection bases 31. The drawings and the description shall refer to eight-connector bases. This is the preferred mode of use of the box according to the invention. However, the same characteristics can be applied to boxes comprising connection bases with more than eight or less than eight connectors.

The anchoring areas 4 each have a spacer 41 whose function and particular features shall be described hereinafter with reference to FIG. 4.

The coiling areas 5 are located between the anchoring areas 4 and the connection areas 3. They each define a volume demarcated by flanges 51 fixed to the edges of the structural section 1 and the connection bases 31. Their function and particular features shall be described hereinafter with reference to FIG. 5.

A passage area 6 is located beneath the connection system area 3 in the slideway of the structural section 1.

The optic fibers 23 cross the access box, most of them in continuity in the passage area 6. Some of them are marked and branched for purposes of connection. They are therefore cleaved in the middle and connectors are mounted on the spot and mounted on the connection bases 31.

Behind the connectors, there is a fiber over-length of about 40 cm for the connection. The stripped, connected optic fibers are coiled in coiling areas 5 on each side of the connection bases 31.

FIG. 4 gives a detailed view of an anchoring area 4 of the box according to the invention.

The anchoring area 4 has a dual function. Firstly, it holds the cable 2 and secondly it centers the optic fibers 23 in the box.

More particularly, after the stripping preparation, the sheathing of the cable is cut axially into two half-sheaths 21 so as to release the optic fibers 23. An appropriate tool is used to carry out this axial cutting without destroying the strength members.

The anchoring area 4 has a spacer 41 with a central cavity 42 for the passage of the optic fibers 23 and two symmetrical cavities 43 for the passage of the half-sheaths 21.

The spacer 41 is used firstly to fix the cable 2 and more particularly the half-sheaths 21 of the cable 2 in order to hold the cable 2 when the box according to the invention is used in the vertical position and secondly to hold the half-sheaths 21 spread apart in order to facilitate access to the optic fibers 23.

According to a preferred embodiment, the spacer 41 has corners 44 that project towards the edges of the structural section 1 in the cavities 43 for the passage of the half-sheaths 21. These corners 44 advantageously clamp the half-sheaths 21 against the edges of the structural section 1 in order to hold them.

Preferably, screws 45 cross the spacer 41 from one side of the central cavity 42 to the other, pressing respectively on the corners 44 so as to clamp the half-sheaths 21 between the corners 44 and the edges of the structural section 1.

The anchoring areas 4 are the entry/exit points of the optic cable in the box according to the invention. They are designed to preserve the integrity of the cable.

FIG. 5 gives a detailed view of a coiling area 5 of the box according to the invention.

Each coiling area 5 defines a volume demarcated by the connection base 31 and two flanges 51 placed on each side of the structural section 1 in order to create a space in which the cleaved optic fibers 24 which are loose and unstressed can be coiled and connected.

Indeed, the optic fibers 23 released from their sheath 21 penetrate the coiling area 5. Certain optic fibers 23 are cleaved at 24 so as to be connected to the connection base 31 by connectors 32 while the other optic fibers 23 cross the box continuously in a masked passage.

Preferably, the passing optic fibers 23 are kept centered in the passage area 6 by elastomer buffers 56 that prevent sliding when the box is placed vertically. These buffers 56 are placed just behind the spacers 41.

The connectors 32 are of a known type such as connectors to be mounted on site. They are, for example, connectors known as "optoclips", mounted by crimping and breaking, without any addition of external energy.

It is also possible to use connectors with cable ends connected by pigtail splicing. In this case, the pigtail splices are stowed in the coiling area.

The flanges 51 consist of plates with a thickness of 4 mm to 5 mm comprising grooves 53 within their upper part.

The spacing between the flanges 51 defining the coiling volume is maintained by one or more distance sleeves 55.

The flanges 51 may for example be screwed to the structural section 1 or attached by any other appropriate means.

A safety cap 52 slides in the grooves 53 so as to prevent access to the stripped optic fibers 24.

The flanges 51 furthermore have another groove 54 above the groove 53 so as to obtain a sliding of a branching cap 7 that will protect the branch-connected optic fibers 35 outside the connection area.

The safety cap 52 and branching cap 7 are described more specifically hereinafter with reference to FIGS. 9 and 10.

Figure 6:
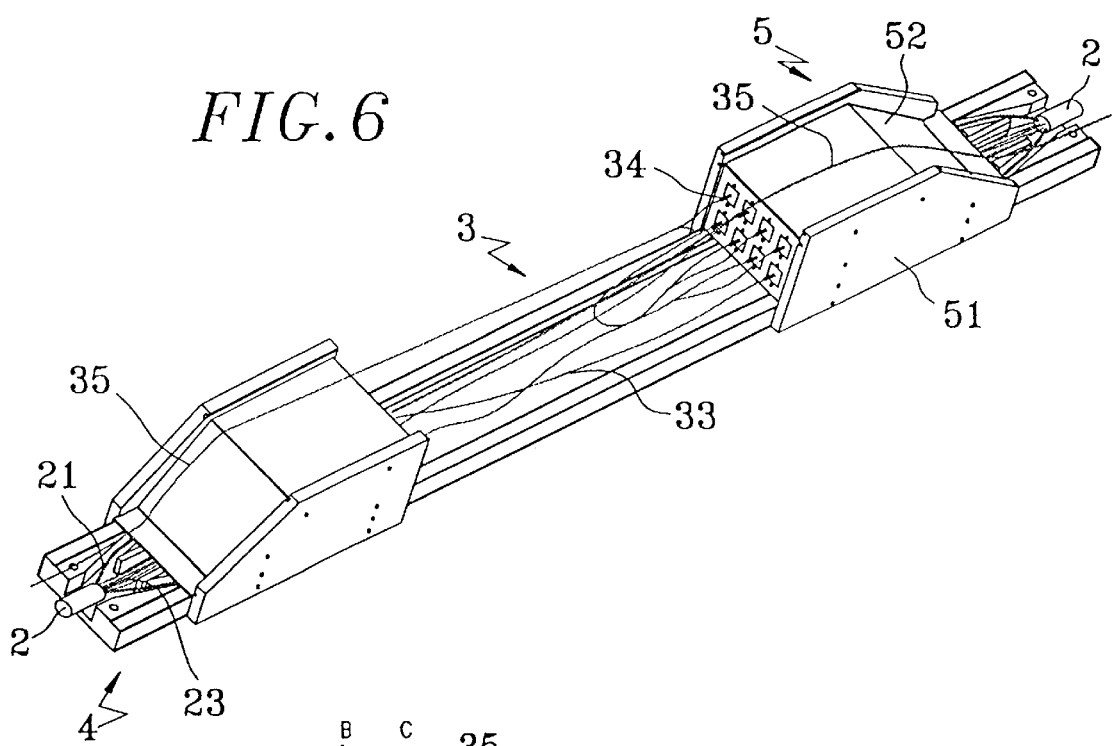
FIG. 6 is a drawing in perspective of the box according to the invention.

FIG. 6 gives a detailed view of the connection area 3 of the box according to the invention.

The connection area 3 is advantageously in the center of the box, between the two connection bases 31 and above the continuous crossing area 6 for the non-cleaved optic fibers 23.

A plurality of mini-cables 33 or "jumper cables" as they are called in telecommunications terminology provide the connection between the two connection bases 31. These mini-cables have a length substantially equal to that of the connection system area 3.

The mini-cables 33 are connected to the connection bases 31 by connectors 34 of the same type as the connectors 32 used on the other side of the base 31 in the coiling areas 5.

Furthermore, one or more branch-connection cables 35 are used for the in-line branch connection of one or more previously marked and cleaved optic fibers 24. These branch connection cables 35 connect one, two or four optic fibers to a connection base 31 and leave the connection system area 3, passing above the safety cap 52 of the coiling area 5.

The purpose of these branch connection cables 35 is to leave the access box in order to connect the branch connected optic fiber or fibers to a working station or other place.

Figure 7A:
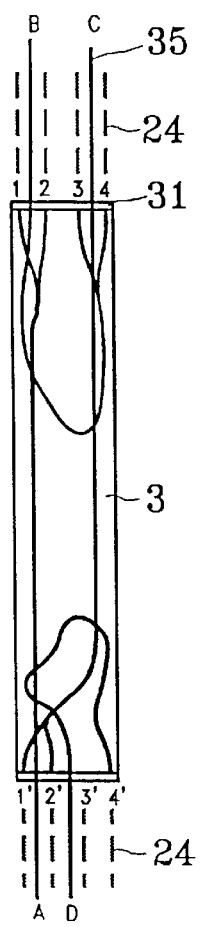
FIGS. 7A and 7B are drawings of branch connection configurations in the connection area.
Figure 7B:
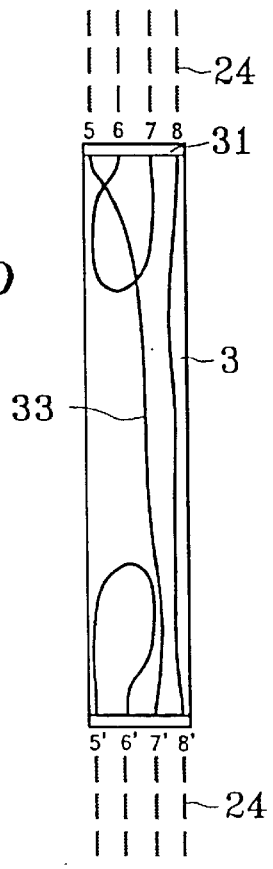

FIGS. 7A and 7B illustrate different possible branchings in the connection area 3.

FIG. 7A shows the connection pads at the top of the connection bases 31, and FIG. 7B shows the connection pads at the bottom of the connection bases. For the sake of clarity, the connections are in sets of four. However, there is no reason to rule out the branch connection of a cleaved fiber 24 connected to the top of one connection base with another fiber connected to the bottom of another connection base.

FIGS. 7A and 7B give a clear illustration of the different possibilities of connection offered by the box according to the invention.

The mini-cables 33 give continuity to certain fibers (8, 8'), set up loops (6, 7) and (5', 6'), and shuffle the fibers (5, 7').

The branching cables 35 enable the branch connection of one or more cleaved fibers 24. Thus, the cable A is a branching of the fibers (1, 2), the cable B is a branching of (3, 4), the cable C is a branching of (1', 2'), and the cable D is a branching of (3', 4').

It is clearly possible to branch one or four fibers outwards.

Figure 8:
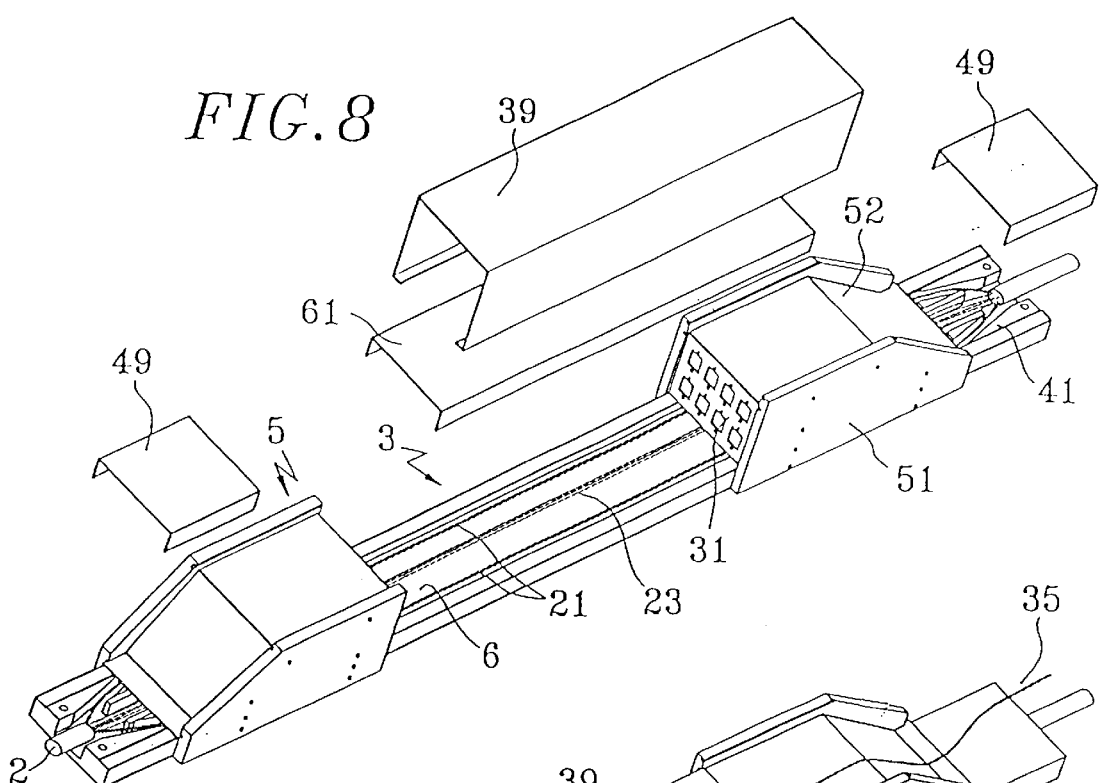
FIG. 8 is a drawing in perspective of the access box according to the invention illustrating the embedding of the protective caps.

FIG. 8 illustrates the box according to the present invention with protection caps on each area.

The coiling areas 5 are covered by a safety cap 52 protecting the cleaved, stripped and coiled optic fibers 24. This cap 52 slides in the grooves 53 of the flanges 51.

The passage area 6 for the non-cleaved optic fibers 23 is located beneath the connection system area 3. The passing optic fibers 23 are protected by an optic modules cap 61 that gets fixed directly to the structural section 1 between the connection bases 31.

The connection systems area 3 for its part is protected by a connection system cap 39 that encloses the entire area up to the connection bases 31. This cap can easily be removed in order to enable simple access to the connection systems area 3.

Furthermore, the anchoring areas 4 are protected by anchoring caps 49 that cover the stripped and spread cable 2 as well as the released optic fibers 23.

FIG. 8 shows that it is quite possible to install the cable and the access box in the infrastructure for which they are designed without making the connection system beforehand.

Indeed, when installing the box, it is enough to cleave some of the optic fibers and connect them to the bases 31 in the coiling areas 5. All that has to be done, when the need arises, is to remove the connection system cap 39 and access the connection system area 3 to connect a mini-cable 33 and/or a branch connection cable 35.

Figure 9:
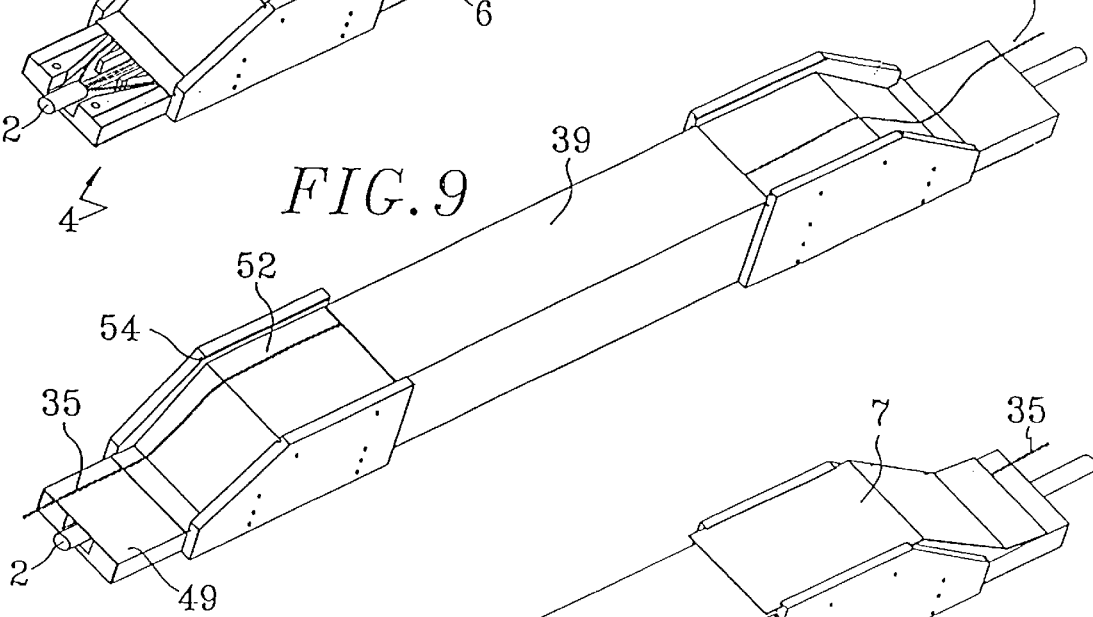
FIG. 9 is a drawing in perspective of the access box according to the invention with protective caps in position and branch-connected fibers.

FIG. 9 illustrates the access box according to the invention with the protection caps in position.

The branch-connected cables 35 emerge from the connection system cap 39 and go above the safety cap 52 of the coiling area 5.

Figure 10:
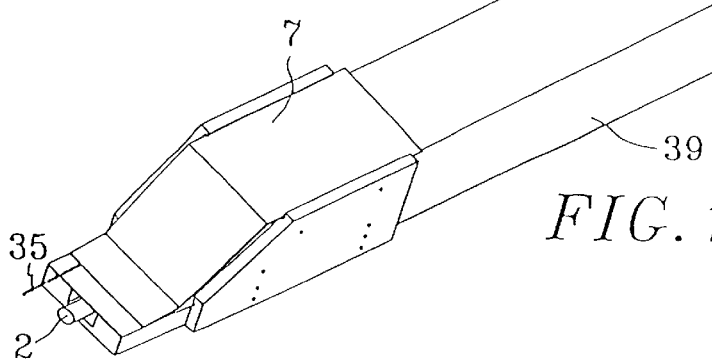
FIG. 10 is a drawing in perspective of the access box according to the invention as shown on site.

FIG. 10 is a diagram of the access box according to the invention as it is on site.

Branch connection caps 7 protect the branch-connected cables 35. These branch connection caps 7 are introduced by drawer effect into the grooves 54 of the flanges 51.

The connection system cap 39 and branch connection cap 7 can advantageously be used to identify the access box through a preset registration such as a mark, a serial number or any other identifier.

The access box according to the invention is a set in kit form to be mounted directly on site. It consists of parts that are easy to make at low cost.

What is claimed is:

1. An access box for one or more optic fibers in a tensioned cable, the box comprising a structural section that integrates the passing cable and having a central connection system area demarcated by two connection bases to which there are connected a plurality of cleaved optic fibers, said connection system area having a plurality of mini-cables providing for the shuffling of the cleaved optic fibers and/or a plurality of branching cables providing for the branch connection of the cleaved optic fibers, wherein the sheath of the cable is axially cut into two half-sheaths as so as to release the optic fibers, and wherein a spacer with two side cavities is provided for the passage of the half-sheaths and a central cavity for the passage of the released optic fibers.

2. An access box according to claim 1, wherein the box furthermore comprises anchoring areas located at each end of the structural section, each anchoring area comprising the spacer enabling access to the optic fibers of the cable.

3. An access box according to claim 1, wherein the spacer has two corners that project into the side cavities, the anchoring of the half-sheaths being obtained by the clamping of said half-sheaths in the side cavities by the action of screws on said corners.

4. An access box according to claim 2, wherein each anchoring area has an anchoring cap.

5. An access box according to claim 1, furthermore comprising an area for the passage of the non-cleaved optic fibers located beneath the connection system area.

6. An access box according to claim 5, wherein the area for the passage of the non-cleaved optic fibers comprises an optic module cap.

7. An access box according to claim 1, wherein connection system area has a connection system cap, said cap being removable.

8. An access box according to claim 1, furthermore comprising two coiling areas that bracket the connection system area and are capable of receiving the cleaved optic fibers.

9. An access box according to claim 8, wherein each coiling area defines a volume demarcated by each connection base and by flanges attached to each side of the structural section.

10. An access box according to claim 9, wherein each coiling area has a safety cap.

11. An access box according to claim 9, wherein each flange has a first groove in its upper part capable of working together with the safety cap.

12. An access box according to claim 9, wherein the spacing between the flanges is maintained by one or more distance sleeves.

13. An access box according to claim 9, wherein the box furthermore comprises a branch connection cap covering the cables branched between the connection system area and the end of the structural section.

14. An access box according to claim 11, wherein each flange has a second groove above the first groove capable of working with the branch connection cap.

15. An access box according to claim 9, wherein the structural section, when seen in a sectional view, has a U shape partially closed to form a slideway.

* * * * *